(12) United States Patent
Kaitsu

(10) Patent No.: US 6,713,196 B1
(45) Date of Patent: Mar. 30, 2004

(54) MAGNETIC RECORDING MEDIUM AND MAGNETIC RECORDING DEVICE

(75) Inventor: Isatake Kaitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/723,250

(22) Filed: Nov. 27, 2000

(30) Foreign Application Priority Data

Apr. 7, 2000 (JP) ........................................ 2000-107073

(51) Int. Cl.$^7$ .............................. G11B 5/66; G11B 5/70
(52) U.S. Cl. ................ 428/694 TS; 428/611; 428/667; 428/900
(58) Field of Search .................... 428/694 TS, 900, 428/65.7, 611, 667

(56) References Cited

U.S. PATENT DOCUMENTS

| | | | |
|---|---|---|---|
| 5,523,173 A | | 6/1996 | Doerner et al. ............. 428/611 |
| 6,071,607 A | * | 6/2000 | Okuyama et al. ........... 428/332 |
| 6,143,388 A | * | 11/2000 | Bian et al. ................. 428/65.3 |
| 6,268,036 B1 | * | 7/2001 | Marinero et al. .......... 428/65.3 |
| 6,403,241 B1 | * | 6/2002 | Chen et al. ............ 428/694 TS |
| 6,432,563 B1 | * | 8/2002 | Zou et al. .............. 428/694 TS |

* cited by examiner

*Primary Examiner*—Holly Rickman
(74) *Attorney, Agent, or Firm*—Greer, Burns & Crain, Ltd.

(57) ABSTRACT

The present invention provides a high-density, low-noise magnetic recording medium. This magnetic recording medium includes a substrate, a non-magnetic underlayer formed on the substrate, and a magnetic recording layer formed on the underlayer. The magnetic recording layer contains cobalt as the main component, 10 atm % to 18 atm % of chromium, 5 atm % to 20 atm % of platinum, and 10 atm % to 20 atm % of boron.

5 Claims, 4 Drawing Sheets

MAGNETIC RECORDING MEDIUM AND MAGNETIC RECORDING DEVICE

BACKGROUND OF THE INVENTION

1. Field of the Invention

The present invention generally relates to magnetic recording media, and, more particularly, to a magnetic recording medium that can achieve a higher signal to noise ratio (S/N ratio) and a higher recording density.

2. Description of the Related Art

In general, circular magnetic disks are widely spread as magnetic recording media used in computers, because a random access can be made to circular magnetic disks. Particularly, magnetic disks having substrates made of a hard material such as aluminum or glass are used. Conventionally, a Cr underlayer is formed on a non-magnetic substrate such as an aluminum substrate, and a magnetic recording layer made of a magnetic alloy containing Co as a main component is formed on the Cr underlayer. Magnetic signals supplied through a magnetic head are recorded on the magnetic recording layer.

In recent years, there has been an increasing demand for higher-density magnetic disks. To achieve higher-density magnetic disks, the noise level of the magnetic recording medium should be lowered, and the S/N ratio should be increased. Therefore, it is necessary to reduce the magnetic particle diameter and to break the magnetic interrelation between magnetic particles. Also, alloys having various compositions containing Co as a main component have been developed. To realize a magnetic recording medium having a density higher than 10 Gb/inch$^2$, the coercivity of the magnetic recording layer needs to be increased, while the noise of the magnetic recording layer needs to be reduced. U.S. Pat. No. 5,523,173 discloses a CoPtCrB alloy thin film as a material that satisfies the above conditions.

U.S. Pat. No. 5,523,173 specifies a preferred composition of the magnetic recording layer, such as, a composition containing 4 atm % (atomic percent) to 12 atm % of platinum (Pt), 18 atm % to 23 atm % of chromium (Cr), and 2 atm % to 10 atm % of boron (B). However, a high recording resolution is required for achieving a recording density of 10 Gb/inch$^2$ or higher in the longitudinal-direction recording so as to satisfy the demand for higher-density recording. To obtain a high recording resolution, the magnetic recording layer needs to be thinner.

The magnetic recording layer having the above composition, however, is liable to have a low saturation magnetization due to higher-concentration Cr and noise. As a result, in a conventional magnetic recording medium having such a thinner magnetic recording layer, the output of reproduction signals is not sufficient.

SUMMARY OF THE INVENTION

A general object of the present invention is to provide magnetic recording media in which the above disadvantages are eliminated.

A more specific object of the present invention is to provide a high-density, low-noise magnetic recording medium.

The above objects of the present invention are achieved by a magnetic recording medium comprising: a substrate; a non-magnetic underlayer formed on the substrate; and a magnetic recording layer formed on the underlayer. In this magnetic recording medium, the magnetic recording layer contains cobalt as a main component, 10 atm % to 18 atm % of chromium, 5 atm % to 20 atm % of platinum, and 10 atm % to 20 atm % of boron.

In the above structure, the concentration of boron is higher than in the prior art, while the concentration of chromium is lower than in the prior art. Thus, noise is lowered, and high-density recording can be achieved.

The above objects of the present invention are also achieved by a magnetic recording device that includes a magnetic recording medium comprising: a substrate; a non-magnetic underlayer formed on the substrate; and a magnetic recording layer formed on the underlayer. In thus magnetic recording device, the magnetic recording layer contains cobalt as a main component, 10 atm % to 18 atm % of chromium, 5 atm % to 20 atm % of platinum, and 10 atm % to 20 atm % of boron.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

The magnetic recording layer of a magnetic recording medium of the present invention contains cobalt (Co) as a main component, and other additive materials including at least chromium, platinum, and boron. The composition of these additive materials is restricted to a predetermined range, so as to realize a high-density, low-noise magnetic recording thin layer.

Generally, when chromium is added to cobalt, chromium deposition occurs around the magnetic particles (i.e., at the grain boundary) having cobalt as the core. As a result, a region having a high Cr concentration is created. Here, the high Cr concentration non-magnetic portion that lies between the Co magnetic particles reduces the magnetic interaction between the magnetic particles, and thus improves the recording reproduction characteristics of the magnetic recording medium. A Co—Cr alloy that does not include boron (B) has lower noise, because the Cr concentration is 20 atm % or higher. With such a Co—Cr alloy, the magnetic interaction between the magnetic particles is reduced, and excellent recording reproduction characteristics can be obtained. U.S. Pat. No. 5,523,173 also discloses the tendency to set the Cr concentration at a high value in a range of 18 atm % to 23 atm %.

With respect to a CoPtCrB alloy thin film, the present inventors made intensive studies on a fact that boron has a function to facilitate the segregation of chromium. As a result, it was found that a composition with a Cr concentration lower than 18 atm % realizes recording with a higher density with lower noise. The effect of boron becomes pronounced especially in high-concentration areas. The B concentration is 10 atm % or higher, preferably in the range of 10 atm % to 20 atm %, and more preferably in the range of 10 atm % to 14 atm %. On the other hand, the Cr concentration becomes lower than in the prior art. When the Cr concentration is lower than 18 atm % or preferably in the range of 10 atm % to 14 atm %, a magnetic recording layer has Co magnetic particles that are isolated and minutely divided. Since the magnetic recording layer has a lower Cr concentration, the saturation magnetization Ms of the magnetic recording layer is higher than that of the conventional magnetic recording layer. Thus, the magnetic recording layer of the present invention can be made thinner, and a high signal output can be obtained in high-density recording areas. According to the present invention, the magnetic recording medium can have a high S/N ratio in a higher density recording area. Also, the magnetic recording medium of the present invention can hold stable magnetic recording information over a long period of time.

Figure 1:
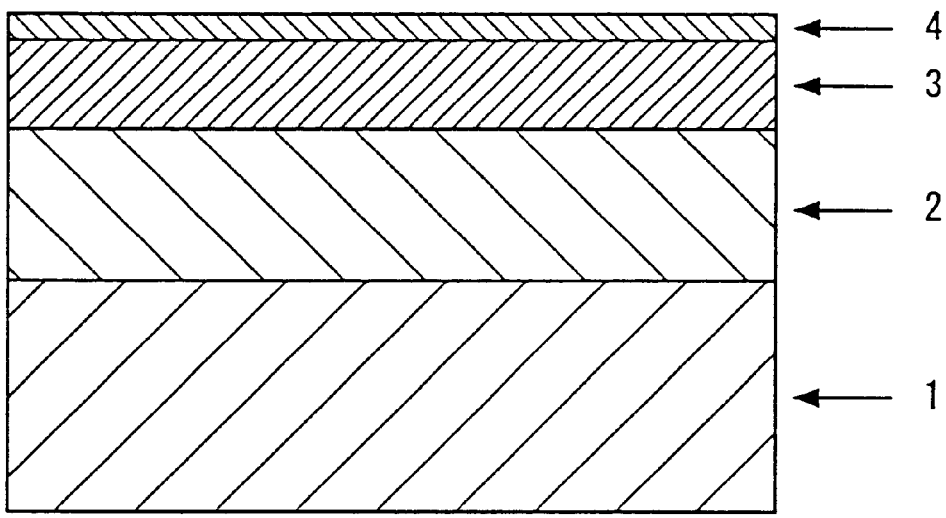
FIG. 1 is a schematic view of the structure of a magnetic recording medium in accordance with the present invention.

FIG. 1 is a schematic view of the structure of a magnetic recording medium 10 of the present invention. On an NiP—Al substrate 1 that has been thoroughly cleaned and is provided with suitable texture finishing are laminated a $Cr_{90}Mo_{10}$ (atomic ratio: atm %) underlayer 2, a $Co_{61}Pt_{11}Cr_{14}B_{14}$ magnetic recording layer 3, and a protection layer 4 mainly containing carbon (C) in that order by a DC magnetron sputtering device. Preferably, a lubricating film containing fluoride is further laminated on the protection layer 4. The film forming chamber is evacuated prior to the film formation of the underlayer 2, so that the degree of vacuum in the film forming chamber can be $3\times10^{-7}$ Torr or lower. The substrate 1 is heated to 220° C. Here, the film formation of each layer is performed, with an argon (Ar) gas being introduced into the film forming chamber and an applied bias being −100 V while maintaining the pressure in the film forming chamber at 5 mTorr. The underlayer 2 is 25 nm in thickness, while the magnetic recording layer 3 is 16 nm in thickness. The underlayer 2 enhances the crystal orientation in the magnetic recording layer 3.

For the underlayer 2, alloys containing Cr can be used. For instance, an alloy containing at least one element selected from the group consisting of Mo, W, Ti, Ir, Ru, and Re alloys may be used. In the composition of the underlayer 2, the concentrations of these materials, except Cr, are in the range of 5 atm % to 30 atm %, and the thickness of the underlayer 2 should preferably be in a range of 5 nm to 30 nm.

An intermediate layer may be interposed between the underlayer 2 and the magnetic recording layer 3 so as to form the magnetic recording layer 3 in more desirable conditions. In such a case, a non-magnetic metallic intermediate layer having a hexagonal close-packed (hcp) structure such as a CoCrMo structure is formed on the underlayer 2. The magnetic recording layer 3 is then formed on the intermediate layer. Besides Mo, a material selected from the group consisting of W, Ti, Ta, Nb, Ir, Ru, and Re may be used, and a desired combination of materials selected from that group may also be used. The thickness of the non-magnetic metallic intermediate layer should preferably be in the range of 1 nm to 8 nm.

Table 1 shows results of a comparison between a magnetic recording medium produced in accordance with the prior art and a magnetic recording medium produced in accordance with the present invention. In this comparative experiment, a 3.5-inch NIP-plated Al substrate (provided with a texture finishing) was used as the substrate, a 25-nm $Cr_{90}Mo_{10}$ layer was used as the underlayer 2, and a 10-nm layer containing carbon was used as the protection layer 4.

The magnetic recording layers of the magnetic recording media of the prior art and the present invention are adjusted, so that the product of the residual magnetization and the thickness of the magnetic recording layer of the prior art becomes equal to that of the present invention.

In the structure of the prior art, chromium contained in the magnetic recording layer is 22 atm %, while boron contained in the magnetic recording layer is 6 atm %. On the other hand, chromium contained in the magnetic recording layer of the present invention is 14 atm %, while the concentration of boron contained in the magnetic recording layer of the present invention is also 14 atm %.

As a result, the thickness of the magnetic recording layer 3 of the present invention becomes smaller than the thickness of the magnetic recording layer of the prior art by approximately 17%, i.e., the thickness of the magnetic recording layer 3 of the present invention is as thin as 15 nm. At the same time, the coercivity Hc measured in the circumferential direction (i.e., the tracking direction of a magnetic disk) increases from 3500 Oe to 4200 Oe. This confirms the fact that the magnetic recording medium of the present invention has a higher recording density than the magnetic recording medium of the prior art.

As can be seen from Table 1, the solitary wave S/N ratio (Siso/Nm) is the same, but the S/N ratio (S/Nm) at a signal recording density 270 (kfci) in the magnetic recording medium of the present invention is more than 1 dB higher than that in the magnetic recording medium of the prior art.

|  | magnetic recording layer composition | magnetic recording layer thickness (nm) | Hc (Oe) | Siso/Nm (dB) | S/Nm At 270 kfci (dB) |
| --- | --- | --- | --- | --- | --- |
| prior art (P/A) | $Co_xPt_yCr_{22}B_6$ | 18 | 3500 | equal | 1 dB less than P/I |
| present invention (P/I) | $Co_{x'}Pt_{y'}Cr_{14}B_{14}$ | 15 | 4200 | equal | 1 dB greater than P/A |

In the production of the magnetic recording medium of the present invention, an NiP—Al substrate is used as a non-magnetic supporting member. However, the same effects can be obtained with a glass substrate. Particularly in a case where a substrate formed by sputtering NiP on a glass substrate is used, similar results are obtained as in the case where the NiP—Al substrate is used.

In the above-mentioned production procedures, the temperature for forming the magnetic recording layer 3 on the NiP—Al substrate is preferably 160° C. to 320° C. Meanwhile, in the case of employing the glass substrate, the temperature should preferably be 160° C. to 400° C.

Figure 2:
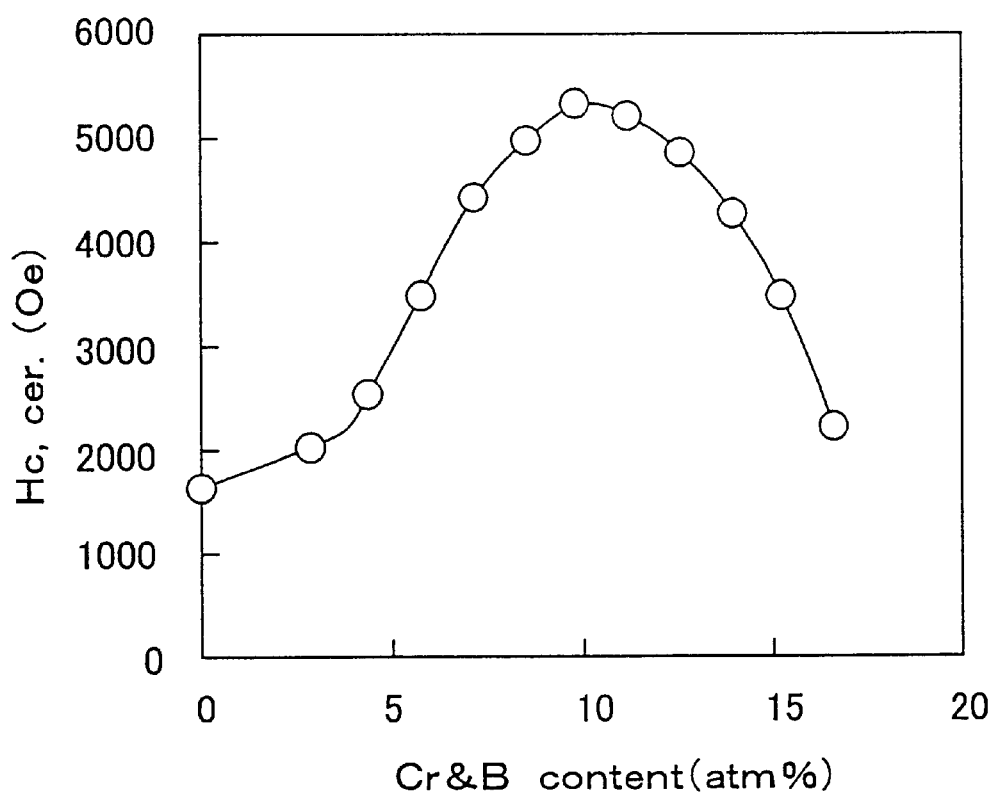
FIG. 2 is a graph illustrating the relationship between the coercivity (Hc) and the Cr and B content in a magnetic recording layer.
Figure 3:
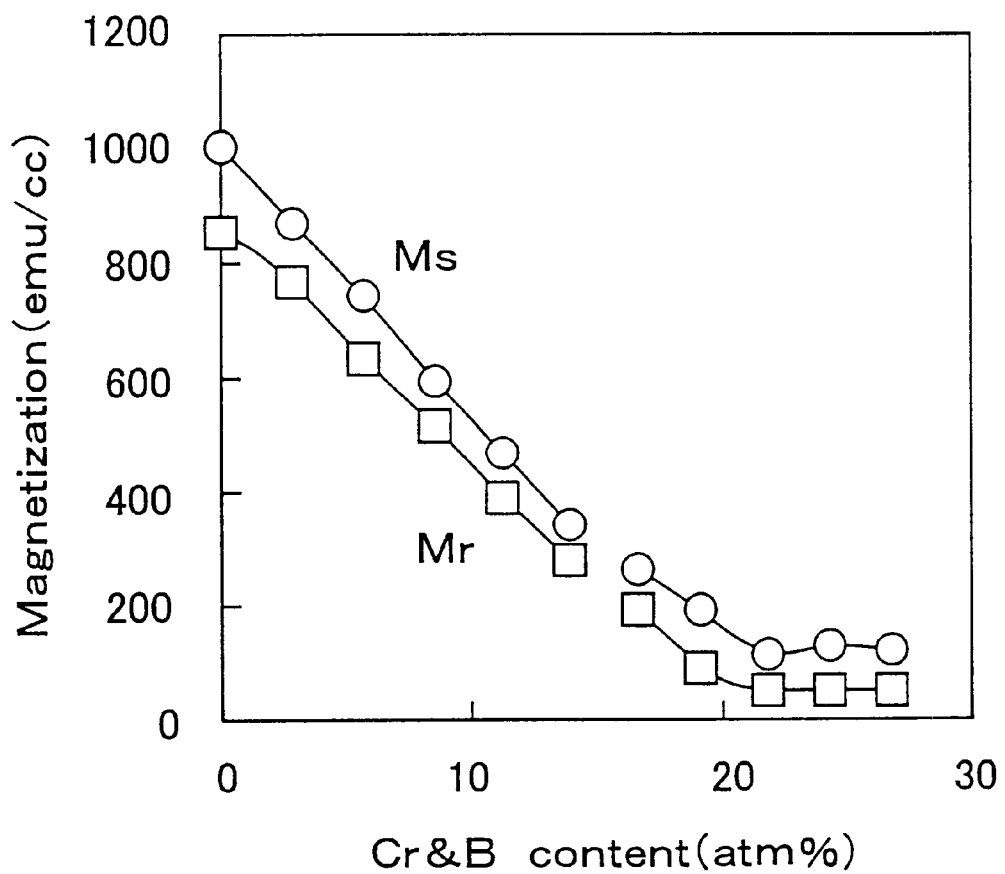
FIG. 3 is a graph illustrating the relationship between magnetization and the Cr and B content in the magnetic recording layer.

FIGS. 2 and 3 shows variations of the magnetic characteristics when the Cr concentration and B concentration were changed in the magnetic recording medium of the present invention. More specifically, FIG. 2 shows the coercivity Hc when the Cr concentration and the B concentration were changed, and FIG. 3 shows the saturation magnetization Ms and the residual magnetization Mr when the Cr concentration and the B concentration were changed.

When CrB was added to $Co_{85}Pt_{15}$, the coercivity (Hc; Oe) in the circumferential direction of the disk substrate varied as shown in FIG. 2. When the Cr concentration and the B concentration were both 10 atm %, the coercivity Hc was approximately 5200 Oe, which is the maximum value. When the Cr concentration and the B concentration were both 14 atm %, the coercivity Hc was higher than 4000 Oe. The coercivity evaluation was performed by a Kerr effect magnetometer.

When CrB was added to $Co_{85}Pt_{15}$, the saturation magnetization (Ms; emu/cc) and the residual magnetization (Mr; emu/cc) varied as shown in FIG. 3. When the Cr concentration and the B concentration were both 14 atm %, the saturation magnetization Ms was maintained at 340 (emu/cc).

Meanwhile, in a conventional low-noise magnetic recording medium having the same composition with respect to cobalt and platinum with a high Cr concentration and a low B concentration, the saturation magnetization Ms was 280 emu/cc. The magnetic recording medium of the present invention has a saturation magnetization Ms more than 20% higher than the saturation magnetization Ms of the conventional magnetic recording medium. This also confirms that the magnetic recording medium of the present invention is suitable for high-density recording.

Although the Cr concentration and the B concentration were the same in the above experiment for ease of explanation, it is of course possible to set the Cr concentration at a value different from the B concentration.

Figure 4:
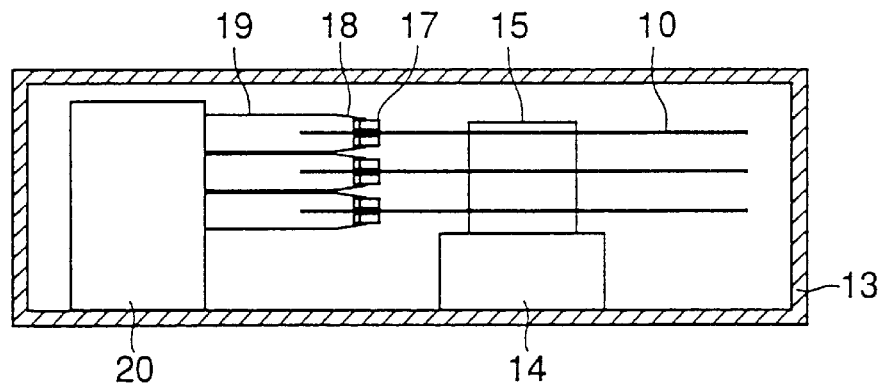
FIG. 4 is a sectional view of a magnetic recording device in accordance with the present invention.
Figure 5:
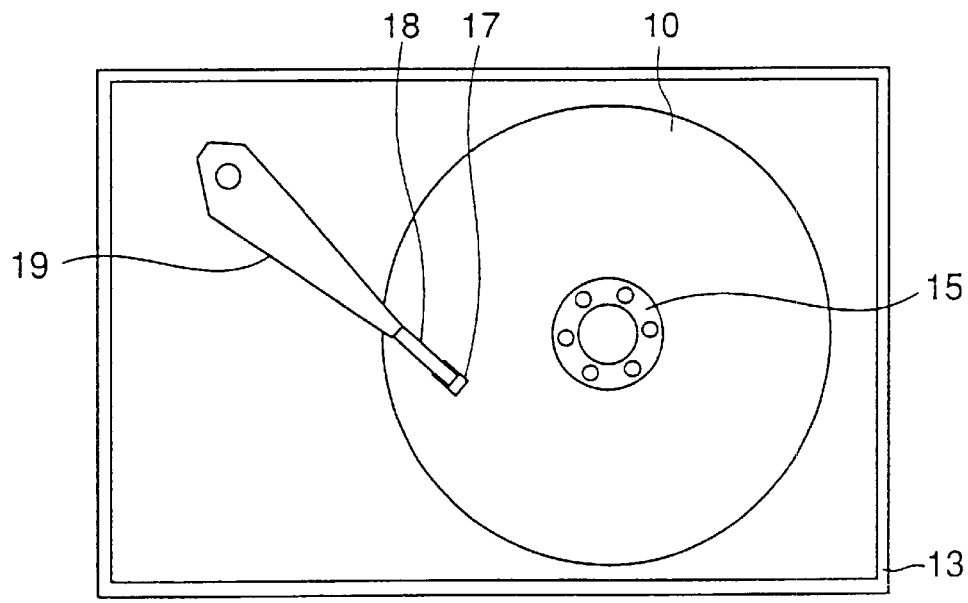
FIG. 5 is a plan view of the magnetic recording device in accordance with the present invention.

Referring now to FIGS. 4 and 5, one embodiment of a magnetic recording device in accordance with the present invention will be described. FIG. 4 is a sectional view of the magnetic recording device, and FIG. 5 is a plan view of the magnetic recording device.

As shown in FIGS. 4 and 5, this magnetic recording device is formed within a housing 13. In this housing 13, the magnetic recording device includes a motor 14, a hub 15, a plurality of magnetic recording media 10, a plurality of reproducing heads 17, a plurality of suspensions 18, a plurality of arms 19, and an actuator unit 20. The magnetic recording media 10 are attached to the hub 15, which is rotated by the motor 14. Each of the reproducing heads 17 is a complex-type head, comprising a reproducing head such as an MR head or a GMR head and a recording head such as an inductive head. Each of the reproducing heads 17 is attached to the top end of each corresponding arm 19 via each corresponding suspension 18. Since the basic structure of this magnetic recording device is well known, further explanation is omitted in this specification.

The above magnetic recording device is characterized by the magnetic recording media 10. Each of the magnetic recording media 10 has the structure described with reference to FIGS. 1 to 3. It should be understood that the number of the magnetic recording media 10 is not limited to 3, and it may be 1 or 2, or more than 3.

The basic structure of the magnetic recording device of the present invention is not limited to the structure shown in FIGS. 4 and 5. Also, the magnetic recording media used in the present invention are not limited to magnetic disks.

The present invention is not limited to the specifically disclosed embodiments, but variations and modifications may be made without departing from the scope of the present invention.

The present application is based on Japanese priority application No. 2000-107073, filed on Apr. 7, 2000, the entire contents of which are hereby incorporated by reference.

What is claimed is:

1. A magnetic recording medium comprising:

a substrate;

a non-magnetic underlayer formed on the substrate in direct contact therewith; and a magnetic recording layer formed on the underlayer, wherein the magnetic recording layer contains 10 atm % to 14 atm % of chromium, 5 atm % to 20 atm % of platinum, 10 atm % to 20 atm % of boron and cobalt as a balancing component, and the underlayer is made of an alloy that contains chromium as a balancing component and at least one element selected from a group consisting of molybdenum, wolfram, iridium, ruthenium, and rhenium, wherein the underlayer contains said at least one element with a concentration of 5 atm % to 30 atm %.

2. The magnetic recording medium as claimed in claim 1, further comprising a non-magnetic metal intermediate layer having a hexagonal close-packed (hcp) structure between the underlayer and the magnetic recording layer.

3. A magnetic recording device that includes a magnetic recording medium comprising:

a substrate;

a non-magnetic underlayer formed on the substrate in direct contact therewith; and a magnetic recording layer formed on the underlayer, wherein the magnetic recording layer contains 10 atm % to 14 atm % of chromium, 5 atm % to 20 atm % of platinum, 10 atm % to 20 atm % of boron, and cobalt as a balancing component, and the underlayer is made of an alloy that contains chromium as a balancing component and at least one element selected from a group consisting of molybdenum, wolfram, iridium, ruthenium, and rhenium, wherein the underlayer contains said at least one element with a concentration of 5 atm % to 30 atm %.

4. The magnetic recording medium as claimed in claim 1, wherein said atm % of chromium in said magnetic recording layer is the same as said atm % of boron in said magnetic recording layer.

5. The magnetic recording device as claimed in claim 3, wherein said atm % of chromium in said magnetic recording layer is the same as said atm % of boron in said magnetic recording layer.

* * * * *